No. 767,606. PATENTED AUG. 16, 1904.
C. STEIN.
VEHICLE TIRE.
APPLICATION FILED OCT. 5, 1903.
NO MODEL.
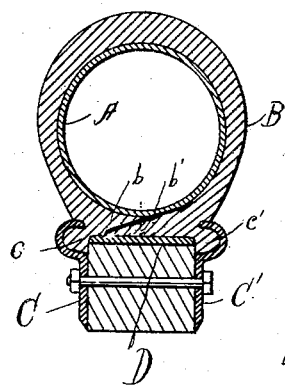
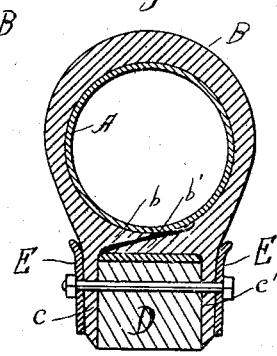
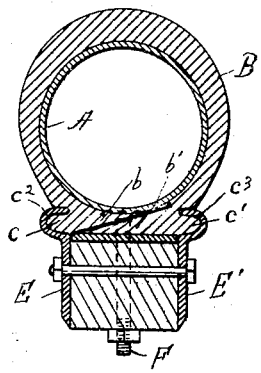
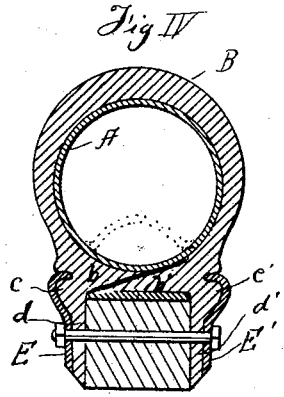
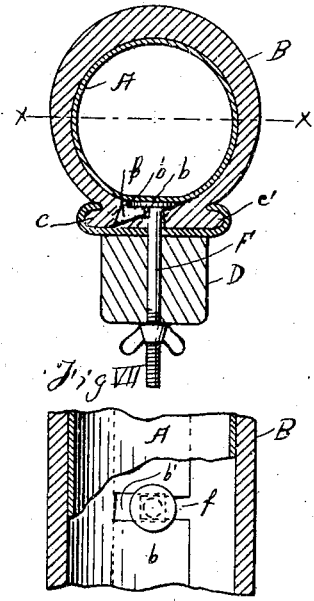
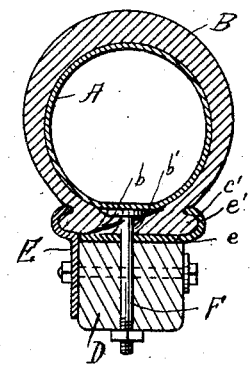
Witnesses:
A. L. Lord
E. B. Donnelly
Inventor
Charles Stein
by
W. E. Cannell
his Attorney No. 767,606.

Patented August 16, 1904.

UNITED STATES PATENT OFFICE.

CHARLES STEIN, OF AKRON, OHIO.

VEHICLE-TIRE.

SPECIFICATION forming part of Letters Patent No. 767,606, dated August 16, 1904.

Application filed October 5, 1903. Serial No. 175,858. (No model.)

*To all whom it may concern:*

Be it known that I, CHARLES STEIN, a citizen of the United States, residing at Akron, in the county of Summit and State of Ohio, have invented certain new and useful Improvements in Vehicle-Tires; and I do hereby declare the following to be a full, clear, and exact description of the invention, such as will enable others skilled in the art to which it pertains to make and use the same.

My invention relates to wheel rims and tires, and more especially to pneumatic tires employing an inner pneumatic tube and an outer covering, retaining, and protecting shoe.

The objects of my invention are to provide a pneumatic tire of the type set forth whereby the inner tube is completely surrounded by the shoe and is easily got at or accessible for the purpose of repairs and whereby the outer shoe or protecting shoe is clamped firmly to the rim of the wheel both when the tire is inflated and when the same is devoid of pressure and is also retained on the rim, so that traction between the rim and tire is impossible.

A further object of my invention is to form the fastening-ridges in combination with the outer or protecting shoe in such a manner that the body of the protecting-shoe at its inner portion will rest upon the rim solidly and form a seat or cushion for the inner tube.

In the drawings, Figure I illustrates my invention as applied to a wheel where side flanges are employed which engage ridges upon the inner side of the shoe, said ridges at their inner portion abutting against the sides of the rim of the wheel, whereby when the flanges are tightened a positive clamping of the lower portion of the outer shoe is attained. Fig. II illustrates my invention as applied to an outer shoe having depending flanges and clamped to the side of the rim. Fig. III illustrates the employment of a clamping-bolt in connection with the side flanges. Fig. IV illustrates side flange-pieces engaging ridges on the protecting-shoe and the protecting-shoe having depending flanges. Fig. V illustrates a construction wherein one of the clamps for retaining the protecting-shoe is constructed in the form of a tire having an inturned flange and the other clamp is constructed in the shape of a side flange. In this construction a clamping-bolt is also employed. Fig. VI illustrates my preferred construction when employing a clamping-bolt by forming either one or both of the overlapping portions of the shoe with slots which engage the clamping-bolt, facilitating the removal of the shoe after the clamping-bolt has been loosened and raised; and Fig. VII is a cross-sectional view on line $x$ $x$, taken through Fig. VI, illustrating more clearly the modifications therein shown.

Heretofore and before my invention the majority of pneumatic tires employing inner tubes and outer divided shoe have been retained in place by means of abutting flanges or ridges on the tire oppositely disposed, with inturned flanges provided on their inner wheel periphery, the whole being held in position by means of air-pressure when the tire was inflated. The objection to this type of tire has been that in case of puncture, resulting in the deflation of the tire, the tire became loose upon the rim of the wheel, as there was nothing to hold it in position. Another defect of this type of tire has been unless the same was highly inflated it loosened more or less on the rim of the wheel and was liable to creep along the same in the line of traction, and more especially was this the case where great speed was required or heavy traction desired.

By my invention I obviate these difficulties and obtain a pneumatic tire far superior from a standpoint of stability, strength, and the ease with which the inner tube is accessible.

A represents the inner tube of the tire, which may be of the usual construction and which is formed of elastic substance, such as rubber, is endless and air-tight.

B represents the shoe or sheath, which is formed of a rubber compound such as is usually employed or may differ in its composition, according to requirements. This shoe or sheath B is constructed so as to inclose the inner tube A snugly, completely surround it and protect it, and for this purpose I have formed the same with overlapping flaps $b$ $b'$, the same overlapping to a considerable extent and forming a seat between the outer periphery of the wheel-rim or its tire and the inner tube. These overlapping flaps are so constructed that they fit together uniformly and snugly, and in case of the employment of a clamping-bolt, such as illustrated in Figs. III, V, VI, and VII, they afford means for the engagement with said clamping-bolt for retaining the outer shoe in position on the rim. They also prevent the inner tube from being forced inwardly through adjoining parts of the inner periphery of the shoe or being pinched by the adjoining parts when the wheel-tire is required to bear any pressure over the normal pressure. They also facilitate the replacement or introduction of the inner tube by preventing the same from catching and providing a smooth surface upon which the same is supported.

As illustrated in Fig. IV of the drawings in dotted lines, the inner flap may be provided with an annular cushioning-buffer extending inwardly and outwardly, so as to form a cushion or buffer in case of the deflation through puncture or otherwise of the inner tube. This is a more or less important feature, inasmuch as it to a great measure provides against both accident when the tires are deflated and also against the cutting or damaging of the outer shoe in such cases. Its construction and location are such that it in no wise interferes with the cushioning effects when the inner tube is inflated.

As hereinbefore stated, the outer shoe of my tire is firmly held in place by mechanical means in contradistinction to being held in place by the air-pressure, and for this purpose I have devised and illustrated several modifications.

In Fig. I, I illustrate two laterally and downwardly extending beads $c\ c'$, which are engaged on their outer edges by means of side clamps C C', which are held in place to the felly of the wheel in such a manner that they may be one or both removed, it being necessary in case of a repair to the inner tube or for inspection of the same to remove one side only. The beads $c\ c'$ extend downwardly, forming a shouldered recess into which fits the outer periphery of the wheel-rim D, and thus it will be seen that as the clamp is drawn tightly the inner periphery of the shoe B is held both toward the axis of the wheel and against the sides of the rim, forming a double clamp-fastening and preventing the shoe from becoming detached in any manner, even in case of deflation through accident or otherwise.

In Fig. II, I have illustrated two inwardly-projecting flanges $c\ c'$ so constructed as to receive the rim and portion of the felly of the wheel. These flanges extend inwardly toward the axis of the wheel sufficiently to be engaged and closely hugged between side plates E E' and the felly D. In this case the plates E E' may be formed in one, two, or more pieces, if desired or found necessary; but this is immaterial. This same feature applies to all the clamping-plates heretofore and hereinafter mentioned.

In Fig. III, I have illustrated two outwardly or laterally extending annular beads $c\ c'$, which are engaged in recesses $c^3\ c^3$, formed in the outer periphery of clamping-plates E E'. I also in this figure illustrate a bolt F, said bolt in the case illustrated being shown as passing through both overlapping flaps. This bolt may, however, be secured to one of the flaps, the lower one preferably, and leave the upper one free, the only object being to prevent creeping of the shoe at its inner periphery upon the outer periphery of the rim and hold the shoe snugly to the rim. The bolt F is illustrated in this figure as being provided with an ordinary nut; but in practice I intend to employ what is commonly termed a "thumb-nut," such as is illustrated in Fig. VI. However, any means may be employed as a substitute for the nut, providing it performs the necessary functions required. This bolt may also be formed with a suitable head or be embedded in the material of shoe.

In Fig. IV of the drawings I have illustrated a modification of the form shown in Fig. II, with the additional features of providing laterally-extending annular beads $c\ c'$, which seat themselves in pockets formed in the outer periphery of clamping-plates E E'. I provide a double or multiple fastening means, inasmuch as the shoe is held to the rim or felly through the recesses in the periphery of the clamping-plates and by downwardly or inwardly extending flanges $d\ d'$, the whole being clamped between the clamping-plates and the side of the felly. In this figure in dotted lines I have illustrated the buffer hereinbefore mentioned. This, however, may be modified if found necessary or desirable.

In Fig. V of the drawings I have illustrated a fastening means comprising a tire $e$, having an outwardly and inwardly and laterally turned pocket $e'$, adapted to receive a laterally-extending bead $c'$, formed at the inner periphery of the shoe B. It will thus be seen in this construction that this tire forms at the same time the tire for the felly and one side of the clamping means or mechanism. The opposite side of the clamping means or mechanism comprises a clamping-plate E, similar in construction to those illustrated in Figs. I and III and removably secured to the felly or rim. In this figure I have also illustrated or shown clamping-bolts F, which may be secured in any of the manners hereinbefore set forth.

In Figs. VI and VII I have illustrated a rim or tire having at both sides outwardly and laterally projecting flanges which form annular pockets oppositely disposed, adapted to receive and retain laterally-extending beads $c\ c'$ on the inner periphery of the shoe. However, in these figures I have illustrated my preferred method of securing the shoe to the rim or felly by forming the upper or outer flap with slots *f*, which extend to a point beyond the vertical center of the shoe at both sides and to the outer edge of this flap. Both the inner and the outer flaps may be thus slotted in opposite directions, if desired, or the outer alone. The object of thus forming or slotting the flaps is to facilitate the removal of one side of the shoe by first deflating the inner tube, loosening the nut on the bolt F, pressing one side of the shoe inward until its lateral bead disengages the side pocket from the rim, when that side of the shoe may be lifted outward and access be had to the inner tube. This also facilitates both repairing, examination, and replacing of the inner tube without removing the shoe entirely from the rim.

In setting forth these different modifications of my invention I have illustrated and described certain details as I find them best adapted for the purpose and most convenient for manipulation; but I do not hence wish to be in any manner limited to these details, as they may be still further modified and changed without departing from the spirit of my invention.

What I claim is—

1. A combined wheel rim and tire comprising an inner inflatable tube, an outer protecting and inclosing shoe provided at its inner end with flaps overlapping each other said flaps extending beyond the center of the free edges in opposite directions so as to completely inclose the inner tube, means engaging said shoe at points opposite said flaps for preventing spreading thereof, means for firmly securing said shoe to the rim in combination with said rim.

2. In combination with a rim, a tire embodying an inner inflatable tube and a shoe, flaps carried by the inner edges of said shoe, said flaps overlapping each other and resting on said rim, clamping means engaging said tire at points on opposite sides of said overlapping flaps, and means for securing said clamping means to the rim.

3. In a tire, the combination of a rim, a shoe having its inner edges provided with overlapping flaps, said flaps having their contiguous faces cut on a bevel and being supported on said rim, portions of said shoe projecting on opposite sides of said rim, a clamping means engaging said projecting portions, and means for securing the clamping means to the rim.

Signed at Cleveland, in the county of Cuyahoga and State of Ohio, this 28th day of September, 1903.

CHARLES STEIN.

Witnesses:
E. B. DONNELLY,
W. E. DONNELLY.